United States Patent
Yen et al.

(10) Patent No.: US 9,954,403 B2
(45) Date of Patent: Apr. 24, 2018

(54) ROTOR YOKE

(71) Applicant: Chien-Kuo Yen, Taipei (TW)

(72) Inventors: Chien-Kuo Yen, Taipei (TW); Chun-Tun Yu, Miaoli County (TW)

(73) Assignee: Chien Kuo Yen, Taipei (TW)

( * ) Notice: Subject to any disclaimer, the term of this patent is extended or adjusted under 35 U.S.C. 154(b) by 224 days.

(21) Appl. No.: 15/135,140

(22) Filed: Apr. 21, 2016

(65) Prior Publication Data

US 2016/0315513 A1    Oct. 27, 2016

(30) Foreign Application Priority Data

Apr. 24, 2015    (TW) .............................. 104113253 A

(51) Int. Cl.
*H02K 1/27* (2006.01)
*H02K 1/24* (2006.01)

(52) U.S. Cl.
CPC ............. *H02K 1/276* (2013.01); *H02K 1/246* (2013.01)

(58) Field of Classification Search
CPC ............ H02K 1/12; H02K 1/14; H02K 1/148; H02K 1/24; H02K 1/246; H02K 1/27; H02K 1/276; H02K 1/2766; H02K 1/277; H02K 1/2773; H02K 1/32; H02K 21/12; H02K 21/14; H02K 21/16
See application file for complete search history.

(56) References Cited

U.S. PATENT DOCUMENTS

| | | | | |
|---|---|---|---|---|
| 6,836,045 B2* | 12/2004 | Murakami | ............. | H02K 1/246 310/156.53 |
| 7,151,335 B2* | 12/2006 | Tajima | ................. | H02K 1/2766 310/156.48 |
| 7,791,236 B2* | 9/2010 | Liang | ................... | H02K 1/2766 310/156.01 |
| 7,932,658 B2* | 4/2011 | Ionel | .................... | H02K 1/2766 310/156.33 |
| 8,067,871 B2* | 11/2011 | Tajima | ................. | H02K 1/2766 310/156.48 |
| 8,217,547 B2* | 7/2012 | Kamiya | ................. | H02K 1/148 310/156.56 |
| 9,083,218 B2* | 7/2015 | Mathoy | ................ | H02K 1/2766 |
| 2004/0150282 A1* | 8/2004 | Murakami | ............. | H02K 1/246 310/156.53 |
| 2012/0175989 A1* | 7/2012 | Mathoy | ................ | H02K 1/2766 310/156.53 |
| 2013/0015727 A1* | 1/2013 | Iki | .......................... | H02K 1/246 310/49.43 |

* cited by examiner

*Primary Examiner* — Tran Nguyen
(74) *Attorney, Agent, or Firm* — Hamre, Schumann, Mueller & Larson, P.C.

(57) ABSTRACT

A rotor yoke is rotatable about an axis, is adapted for a plurality of permanent magnets to be mounted therein, and includes a central section, a peripheral section, and a connecting section. The peripheral section is formed with a plurality of outer slots for respectively receiving the permanent magnets. The connecting section is formed with a plurality of inner slots, and a plurality of magnetic reluctance units adjacent to outer slots and each including at least two magnetic reluctance slots that are radially aligned relative to the axis. Each of the magnetic reluctance slots permits portions of magnetic field lines generated by the permanent magnets to pass around the magnetic reluctance slots so as to increase density of the magnetic field lines.

10 Claims, 8 Drawing Sheets

ROTOR YOKE

CROSS-REFERENCE TO RELATED APPLICATION

This application claims priority of Taiwanese Patent Application No. 104113253, filed on Apr. 24, 2015.

FIELD

The disclosure relates to a yoke, snore particularly to a yoke for a permanent magnet rotor.

BACKGROUND

Referring to FIG. 1, a conventional permanent, magnet rotor, as disclosed in U.S. Patent Application No. 2014015364 A1, includes a rotor yoke 1 (also known as rotor core) that is rotatable about an axis 11, and sixteen permanent magnets 2 that are disposed in the rotor yoke 1. The rotor yoke 1 is fabricated by laminating a plurality of metal plates (not shown) that have a magnetic flux density B8000 of 1.65 T or above when the magnetic field strength is 8000 A/m, and the coercivity is 100 A/m or above.

The rotor yoke 1 includes a central section 12 centered at the axis 11, a peripheral section 13 surrounding the central section 12, and a connecting section 14 connected between the central section 12 and the peripheral section 13. The peripheral section 13 includes eight outer slot units 131 equiangularly spaced apart from one another relative to the axis 11. Each of the outer slot units 131 includes two outer slots 1311 which extend along a direction parallel to the axis 11, which are spaced apart from each other and cooperatively having a generally V-shape cross section taken vertical to the axis 11, and in which two of the permanent magnets 2 are respectively received. The connecting section 14 includes eight inner slots 141 equiangularly spaced apart from one another relative to the axis 11, extending along the direction parallel to the axis 11, and arranged alternately with the outer slots units 131 in a zigzag manner relative to the axis 11.

By virtue of the configuration of the rotor yoke 1 and the material used for making the rotor yoke 1, the output torque and the efficiency of the rotor yoke 1 are improved. However, since magnetic field lines 30 of a magnetic field generated by the permanent magnets 2 tend to distribute toward the central section 12, density of the magnetic field lines 30 needs to be enhanced in order to provide a stronger magnetic field and a higher output torque.

SUMMARY

Therefore, an object of the disclosure is to provide a rotor yoke that is configured with a plurality of magnetic reluctance slots for increasing the magnetic field strength and the output torque of the rotor yoke.

According to the disclosure, the rotor yoke is rotatable about an axis and is adapted for s plurality of permanent magnets to be mounted therein. The permanent magnets generate magnetic field lines. The rotor yoke includes a central section, a peripheral section, and a connecting section.

The central section is centered at the axis. The peripheral section surrounds the central section, and is formed with a plurality of outer slots that are equiangularly spaced apart from each other relative to the axis, and that are adapted for the permanent magnets to be respectively mounted therein.

The connecting section is connected between the central section and the peripheral section, and is formed with a plurality of inner slots and a plurality of magnetic reluctance units. The inner slots are equiangularly spaced apart from each other relative to the axis, and are proximate to the central section. Each of the inner slots is aligned with a respective one of the outer slots along a radial direction relative to the axis. The magnetic reluctance units are equiangularly spaced apart from each other relative to the axis, are located between the central section and the outer slots, and each includes at least two magnetic reluctance slots that are spaced apart from each other and that are radially aligned relative to the axis. Each of the magnetic reluctance slots extends along a direction parallel to the axis, has two opposite ends respectively adjacent to two adjacent ones of the outer slots, and is adapted to permit portions of the magnetic field lines to pass around the magnetic reluctance slots and between the inner slots and the outer slots, and to collaborate with the inner slots to prevent the portions of the magnetic field lines from entering the central section.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
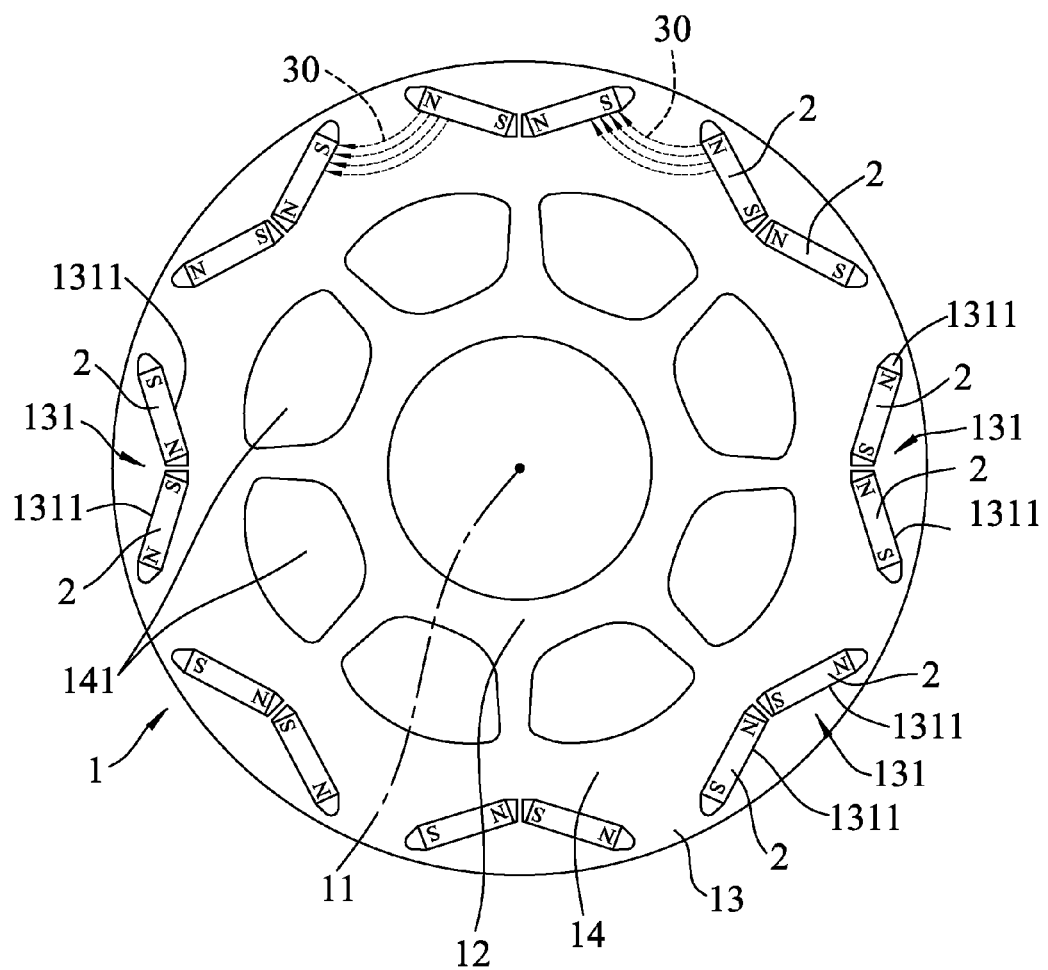
FIG. 1 is a schematic cross-sectional view of a conventional rotor yoke.
Figure 2:
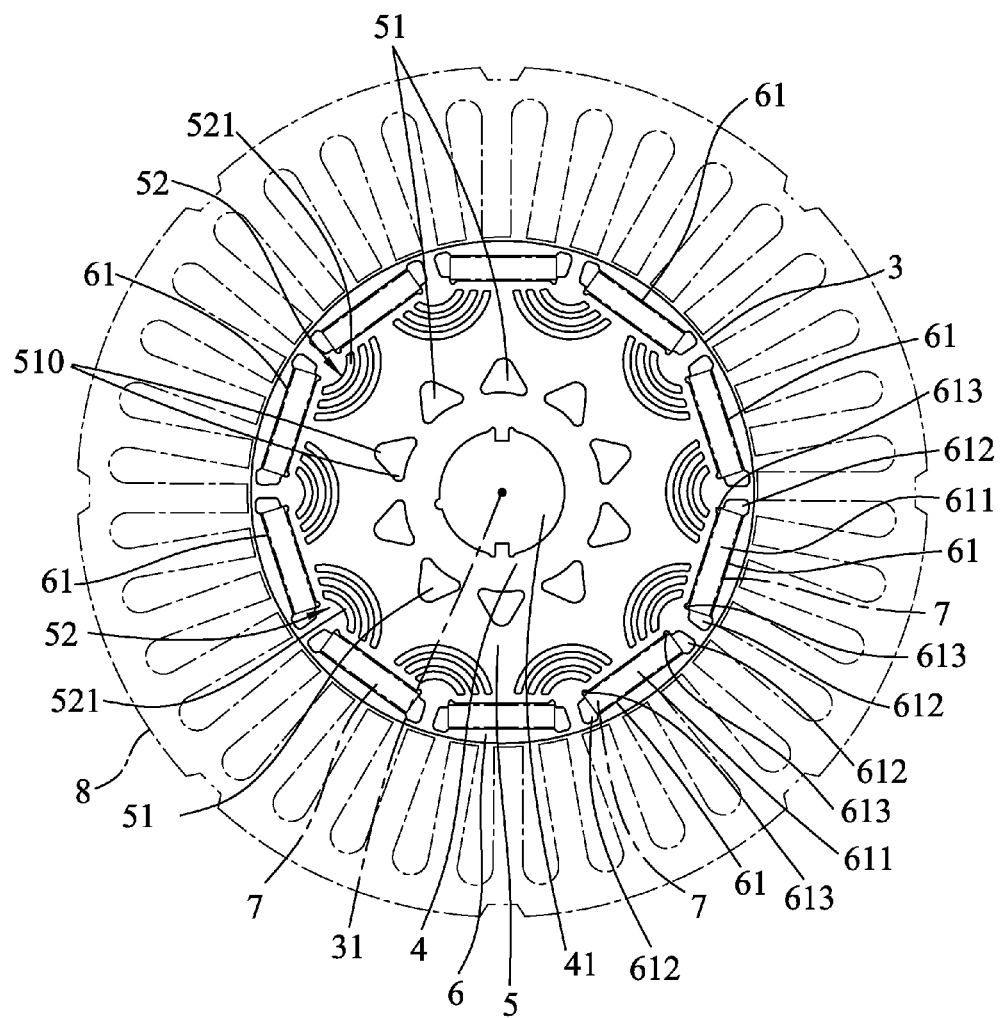
FIG. 2 is a schematic cross-sectional view of an embodiment of a rotor yoke according to the disclosure.
Figure 3:
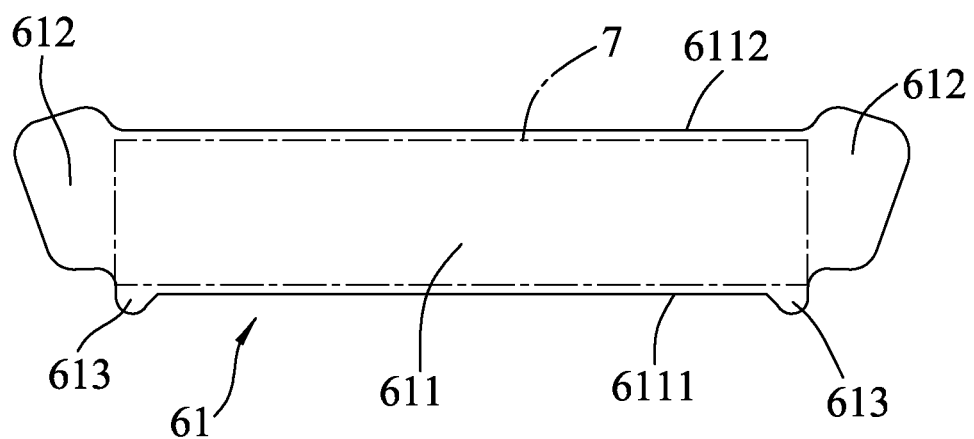
FIG. 3 is an enlarged view of a portion of FIG. 2, illustrating an outer slot of a peripheral section of the embodiment.
Figure 4:
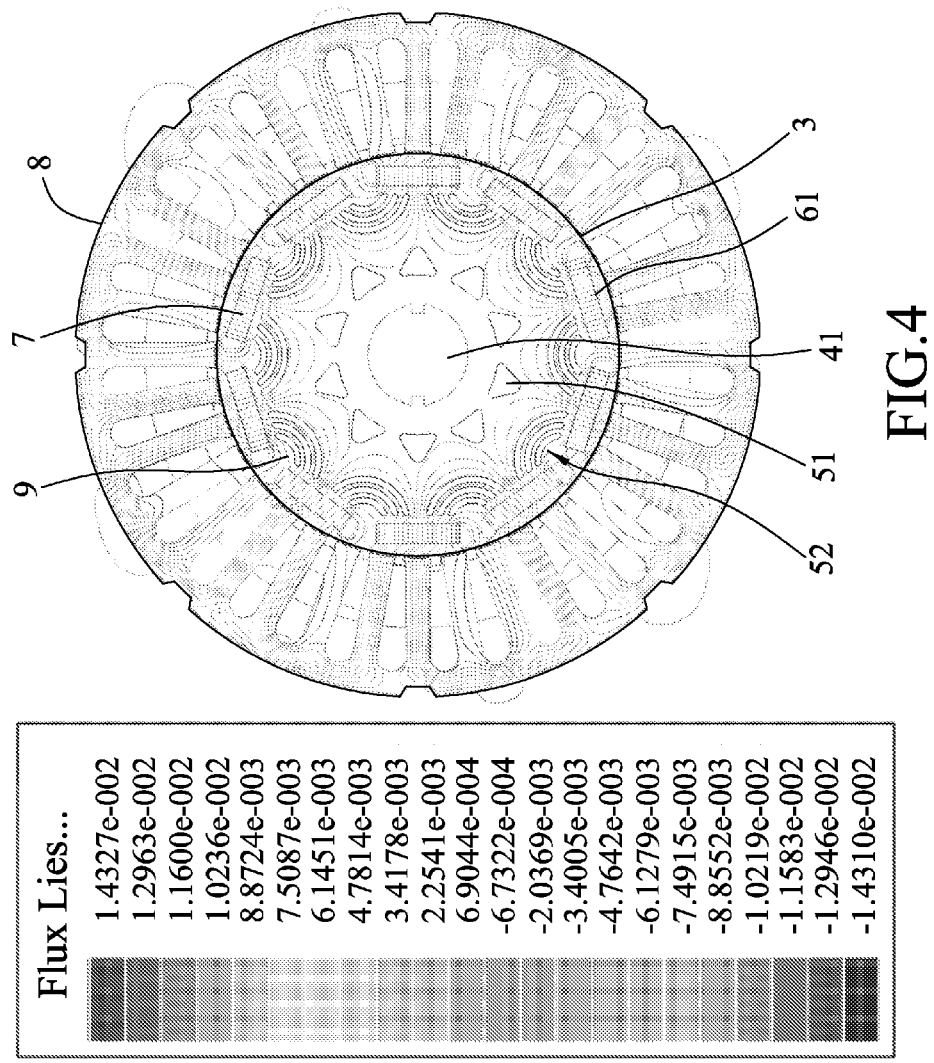
FIG. 4 is a graph illustrating distribution of magnetic field lines of a permanent magnet rotor including the embodiment.

Referring to FIGS. 2 to 4, an embodiment of a rotor yoke 3 according to the disclosure is rotatable about an axis 31 relative to a stator 8, and is for ten permanent magnets 7 to be mounted therein. The permanent magnets 7 generate a magnetic field having magnetic field lines 9. The rotor yoke 3 is cylindrical, and includes central section 4 centered at the axis 31, a peripheral section 6 surrounding the central section 4, and a connecting section 5 connected between the central section 4 and the peripheral section 6.

The central section 4 is formed with a shaft hole 41 which extends along the axis 31, and in which a drive shaft (not shown) is disposed for driving rotation of the rotor yoke 3.

The peripheral section 6 is formed with ten outer slots 61, which are equiangularly spaced apart from each other relative to the axis 31, which extend in a direction parallel to the axis 31, and in which the permanent magnets 7 are respectively mounted. In certain embodiments, the numbers of the outer slots 61 and of the permanent magnets 7 are not limited to ten, and may be two, three, four, eight, or twelve, etc.

As best shown in FIG. 3, each of the outer slots 61 has a mounting slot portion 611, two extending slot portions 612, and two protruding slot portions 613. Each mounting slot portion 611 receives a corresponding one of the permanent magnets 7 therein in a tight fitting manner, so as to prevent the permanent magnets 7 from spinning out of the outer slots 61 when the rotor yoke 3 is rotating at a relatively high speed. Each mounting slot portion 611 has a first long side 6111 proximate to the axis 31, and a second long side 6112 opposite to the first long side 6111 and distal from the axis 31. The two extending slot portions 612 extend outwardly and respectively from two opposite ends of the corresponding mounting slot portion 611, and away from the axis 31. The two protruding slot portions 613 are spaced apart from each other, extend from the first long side 6111 toward the axis 31, and are disposed adjacent to the two extending slot portions 612, respectively.

In this embodiment, for each outer slot 61, the extending slot portions 612 contain air, and the protruding slot portions 613 can be used to pry out a corresponding one of the permanent magnets 7 or to assist in installation of the corresponding one of the permanent magnets 7 therein. In certain embodiments, the extending slot portions 612 of each of the outer slots 61 are filled with an adhesive (not shown) so as to fix the permanent magnets 7 in the corresponding outer slots 61, and the protruding slot portions 613 of a corresponding one of the outer slots 61 provide additional space for accommodating the excess adhesive that is extruded out of the corresponding mounting slot portion 611 when the corresponding permanent magnets 7 is mounted thereinto, so as to eliminate the need for removing the excess adhesive on an outer surface of the rotor yoke 3.

The connecting section 5 is formed with ten inner slots 51 and ten magnetic reluctance units 52.

The inner slots 51 are equiangularly spaced apart from each other relative to the axis 31, extend in the direction parallel to the axis 31, and are proximate to the central section 4. Each of the inner slots 51 is aligned with a respective one of the outer slots 61 along a radial direction relative to the axis 31. In greater detail, each of the inner slots 51 of the connecting section 5 has a shape of a triangular prism, and has three corner portions 510 that are spaced apart from one another. One of the corner portions 510 points toward the corresponding one of the outer slots 61.

The magnetic reluctance units 52 are equiangularly spaced apart from each other relative to the axis 31, and are located between the central section 4 and the outer slots 61. Each of the magnetic reluctance units 52 includes three magnetic reluctance slots 521 that are spaced apart from each other and that are radially aligned relative to the axis 31. Each of the magnetic reluctance slots 521 extends along the direction parallel to the axis 31, and has two opposite ends respectively adjacent to two adjacent ones of the outer slots 61. As illustrated in FIG. 2, each of the magnetic reluctance slots 521 has a cross section that is taken perpendicular to the axis 31, that is arc-shaped, and that is convex toward the axis 31. The cross sections of the magnetic reluctance slots 521 of each of the magnetic reluctance units 52 increase in arc length toward the axis 31. In certain embodiments, the numbers of the inner slots 51 and of the magnetic reluctance units 52 are not limited to ten, and may be two, three, four, eight, or twelve, etc.

Figure 5:
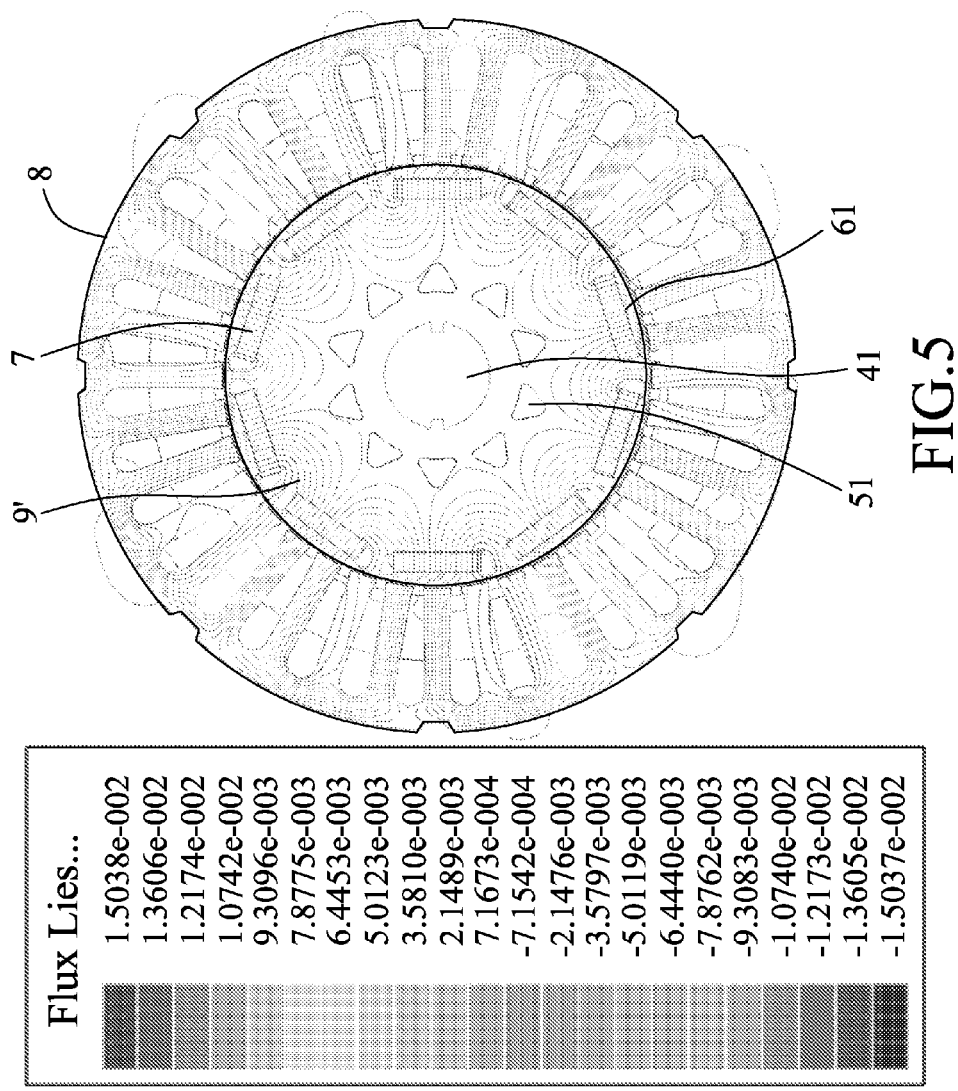
FIG. 5 is a graph illustrating distribution of magnetic field lines of a permanent magnet rotor of a comparative example.

FIG. 4 illustrates distribution of the magnetic field lines 9 of a permanent magnet rotor including the rotor yoke 3 of the embodiment. FIG. 5 illustrates distribution of magnetic field lines 9' of a permanent magnet rotor of a comparative example, in which the magnetic reluctance units 52 are omitted. In comparison, the magnetic reluctance slots 521 of this embodiment contain air and have a relatively high magnetic reluctance. Each of the magnetic reluctance slots 521 permits portions of the magnetic field lines 9 to pass around the magnetic reluctance slots 521 and between the inner slots 51 and the outer slots 61, and to collaborate with the inner slots 51 to prevent the portions of the magnetic field lines 9 from entering the central section 4.

Figure 6:
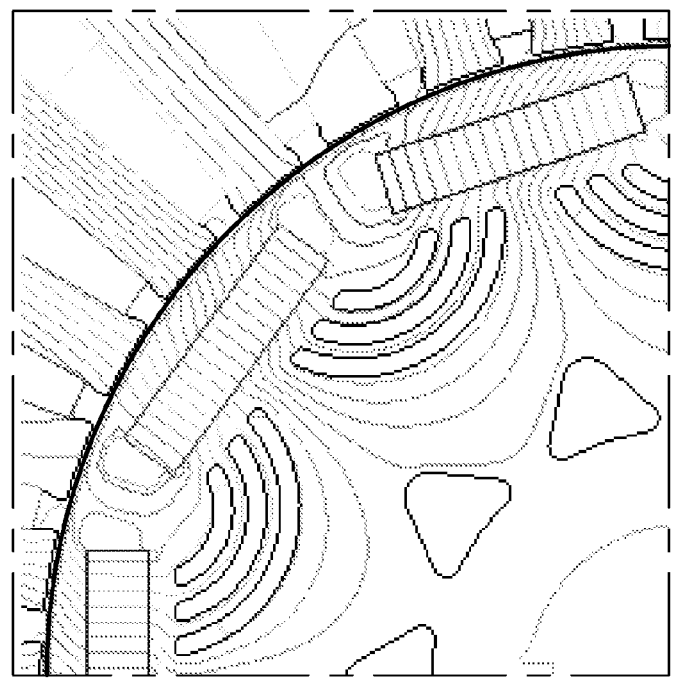
FIG. 6 is an enlarged view of a portion of FIG. 4, illustrating the distribution of the magnetic field lines around a plurality of magnetic reluctance slots of the embodiment.
Figure 7:
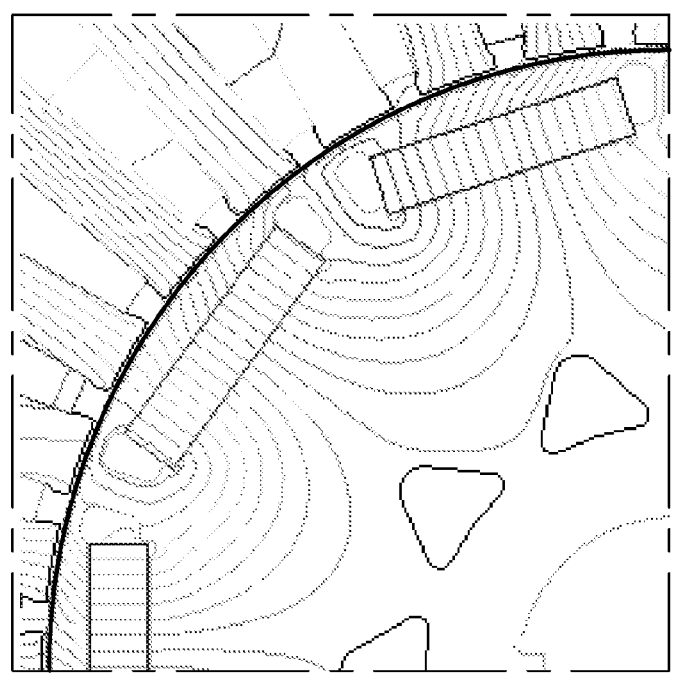
FIG. 7 is an enlarged view of a portion of FIG. 5, illustrating the distribution of the magnetic field lines of the comparative example.

Referring to FIGS. 6 and 7, comparing with the permanent magnet rotor of the comparative example, since portions of the magnetic field lines 9 of the magnetic field generated using the rotor yoke 3 of this embodiment pass around the magnetic reluctance slots 521, density of the magnetic field lines 9 that pass through area between any two adjacent ones of the magnetic reluctance units 52 is higher, thereby contributing to generate a stronger magnetic field.

Figure 8:
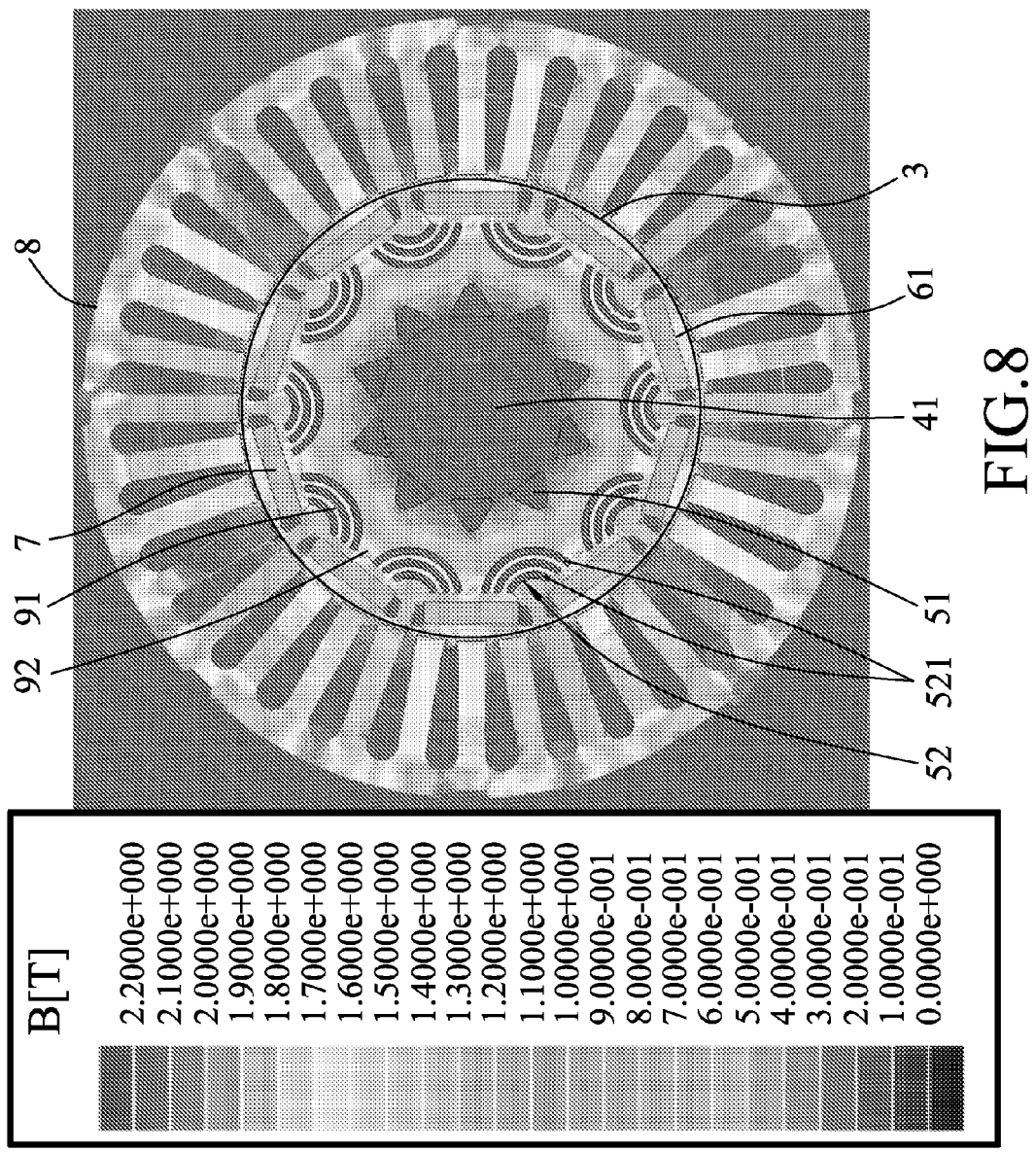
FIG. 8 is a graph illustrating magnetic flux density of the permanent magnet rotor including the embodiment.
Figure 9:
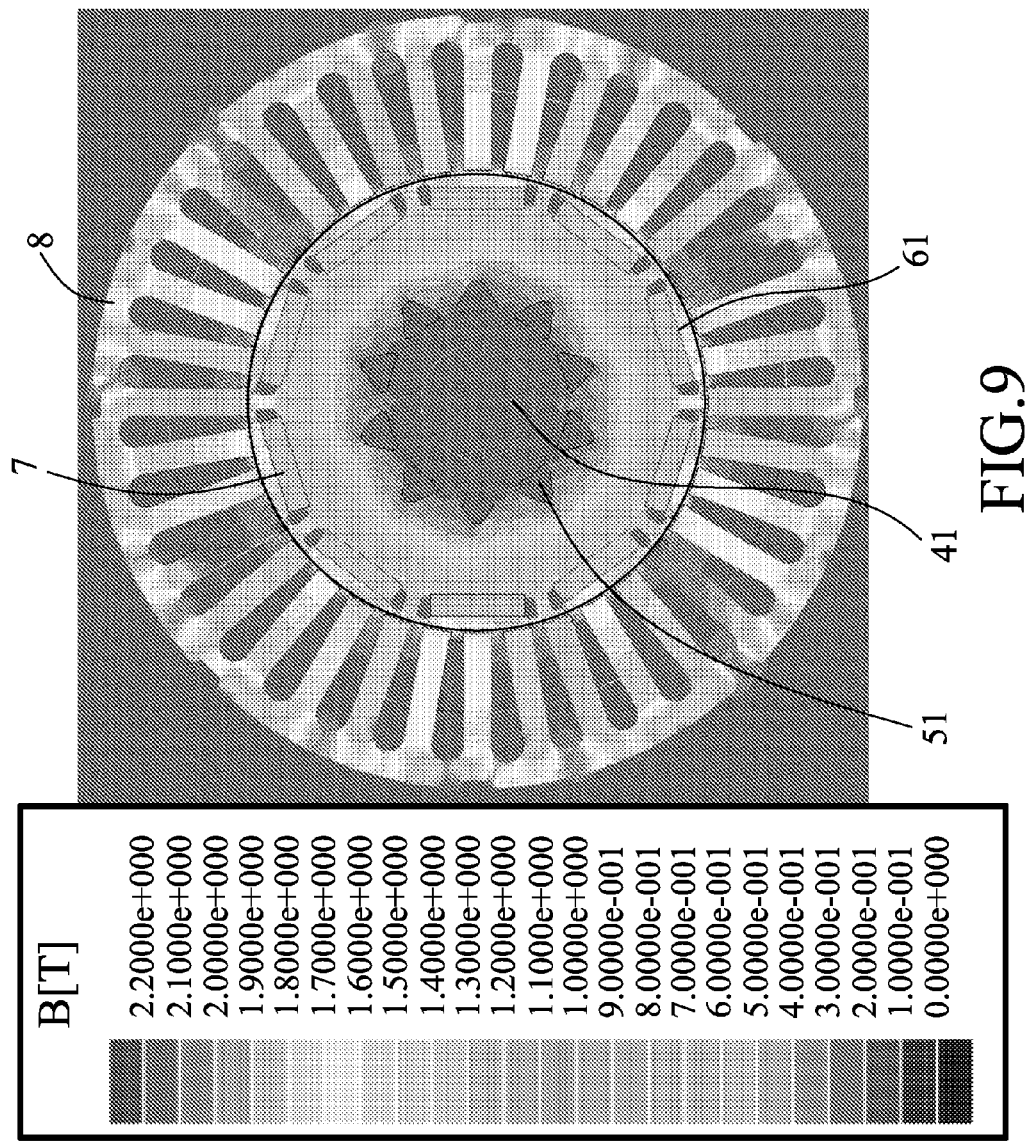
FIG. 9 is a graph illustrating magnetic flux density of the comparative example.

FIGS. 8 and 9 illustrate magnetic flux density distributions of the permanent magnet rotor including the embodiment and of the comparative example, respectively. The magnetic flux density of an area 91 between any two adjacent ones of the magnetic reluctance slots 521 is higher than that of a corresponding area in the comparative example. The magnetic flux density of an area 92 between any two adjacent ones of the magnetic reluctance units 52 is higher than that of a corresponding area in the comparative example. More specifically, the magnetic flux density of the area 91 between any two adjacent ones of the magnetic reluctance slots 521 is about 1.6 T, and the magnetic flux density of the corresponding area in the comparative example is about 1.0 T. The magnetic flux density of the area 92 between any two adjacent ones of the magnetic reluctance units 52 is about 1.6 T, and the magnetic flux density of the corresponding area in the comparative example is about 1.0 T.

By virtue of the configuration of the magnetic reluctance slots 521, density of the magnetic field lines 9 of the magnetic field generated by the permanent magnets 7 is higher, thereby increasing the magnetic flux density and generating a stronger magnetic field. Thus, when applying the rotor yoke 3 of this disclosure to a permanent magnet rotor, the rotor yoke 3 provides a higher output torque.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A rotor yoke rotatable about an axis and is for a plurality of permanent magnets to be mounted therein, said permanent magnets generating magnetic field lines, said rotor yoke comprising:
a central section centered at the axis;
a peripheral section that surrounds said central section, and that is formed with a plurality of outer slots equiangularly spaced apart from each other relative to the axis and, said plurality of outer slots are for the permanent magnets to be respectively mounted therein; and
a connecting section that is connected between said central section and said peripheral section, and that is formed with
a plurality of inner slots equiangularly spaced apart from each other relative to the axis and proximate to said central section, and each of the plurality of inner slots being aligned with a respective one of said outer slots along a radial direction relative to the axis, and
a plurality of magnetic reluctance units equiangularly spaced apart from each other relative to the axis, located between said central section and said outer slots, and each of the plurality of magnetic reluctance units including at least two magnetic reluctance slots that are spaced apart from each other and radially aligned relative to the axis, each of said magnetic reluctance slots extending along a direction parallel to the axis, having two opposite ends respectively adjacent to two adjacent ones of said outer slots, and permitting portions of the magnetic field lines to pass around said magnetic reluctance slots between said inner slots and said outer slots, and to collaborate with said inner slots to prevent the portions of the magnetic field lines from entering said central section.

2. The rotor yoke as claimed in claim 1, wherein said outer slots and said inner slots extend in the direction parallel to the axis.

3. The rotor yoke as claimed in claim 1, wherein each of said magnetic reluctance slots of each of said magnetic reluctance units has a cross section that is taken perpendicular to the axis, that is arc-shaped and that is convex toward the axis.

4. The rotor yoke as claimed in claim 3, wherein the cross sections of said magnetic reluctance slots of each of said magnetic reluctance units increase in arc length toward the axis.

5. The rotor yoke as claimed in claim 1, wherein each of said outer slots has a mounting slot portion is for receiving a corresponding one of the permanent magnets therein, and two extending slot portions extending outwardly and respectively from two opposite ends of said mounting slot portion.

6. The rotor yoke as claimed in claim 5, wherein said mounting slot portion of each of said outer slots receives the corresponding one of the permanent magnets in a tight fitting manner.

7. The rotor yoke as claimed in claim 5, wherein said mounting slot portion of each of said outer slots has a first long side proximate to the axis and a second long side opposite to said first long side and distal from the axis, each of said outer slots further having two spaced-apart protruding slot portions extending from said first long side toward the axis.

8. The rotor yoke as claimed in claim 7, wherein said protruding slot portions of each of said outer slots are disposed adjacent to said extending slot portions of a corresponding one of said outer slots, respectively.

9. The rotor yoke as claimed in claim 1, wherein each of said inner slots of said connecting section has a shape of a triangular prism.

10. The rotor yoke as claimed in claim 9, wherein each of said inner slots has three corner portions that are spaced apart from one another, one of said corner portions pointing toward the corresponding one of said outer slots.

* * * * *